United States Patent [19]
Cawiezel et al.

[11] Patent Number: 5,633,220
[45] Date of Patent: May 27, 1997

[54] HIGH INTERNAL PHASE RATIO WATER-IN-OIL EMULSION FRACTURING FLUID

[75] Inventors: Kay E. Cawiezel, Longview, Tex.; Richard Hodge, Ponca City, Okla.

[73] Assignee: Schlumberger Technology Corporation, Houston, Tex.

[21] Appl. No.: 300,256

[22] Filed: Sep. 2, 1994

[51] Int. Cl.$^6$ .................................. C09K 3/00
[52] U.S. Cl. .................. 507/117; 507/118; 507/250; 507/922; 507/923; 507/937
[58] Field of Search .................. 507/922, 933, 507/937, 117, 118, 250

[56] References Cited

U.S. PATENT DOCUMENTS

| | | | |
|---|---|---|---|
| 3,710,865 | 1/1973 | Kiel | 166/308 |
| 3,977,472 | 8/1976 | Graham et al. | 166/283 |
| 4,233,165 | 11/1980 | Salathiel et al. | 507/200 |
| 4,504,276 | 3/1985 | Baker | 44/302 |
| 4,509,950 | 4/1985 | Baker | 44/302 |
| 4,776,966 | 10/1988 | Baker | 507/117 |

Primary Examiner—Richard L. Raymond
Attorney, Agent, or Firm—John E. Vick, Jr

[57] ABSTRACT

A high internal phase ratio water-in-oil emulsion containing an emulsifier comprising a block or graft copolymer the general formula $(A-COO)_{mB}$ or a reaction product of a polyalk(en)yl succinic anhydride and a polar compound having at least one hydroxyl or amino group demonstrates surprisingly low pumping friction pressure losses, high temperature stability and excellent proppant carrying capacity for use as a fracturing fluid in the hydraulic fracturing of subterranean formation.

21 Claims, 6 Drawing Sheets

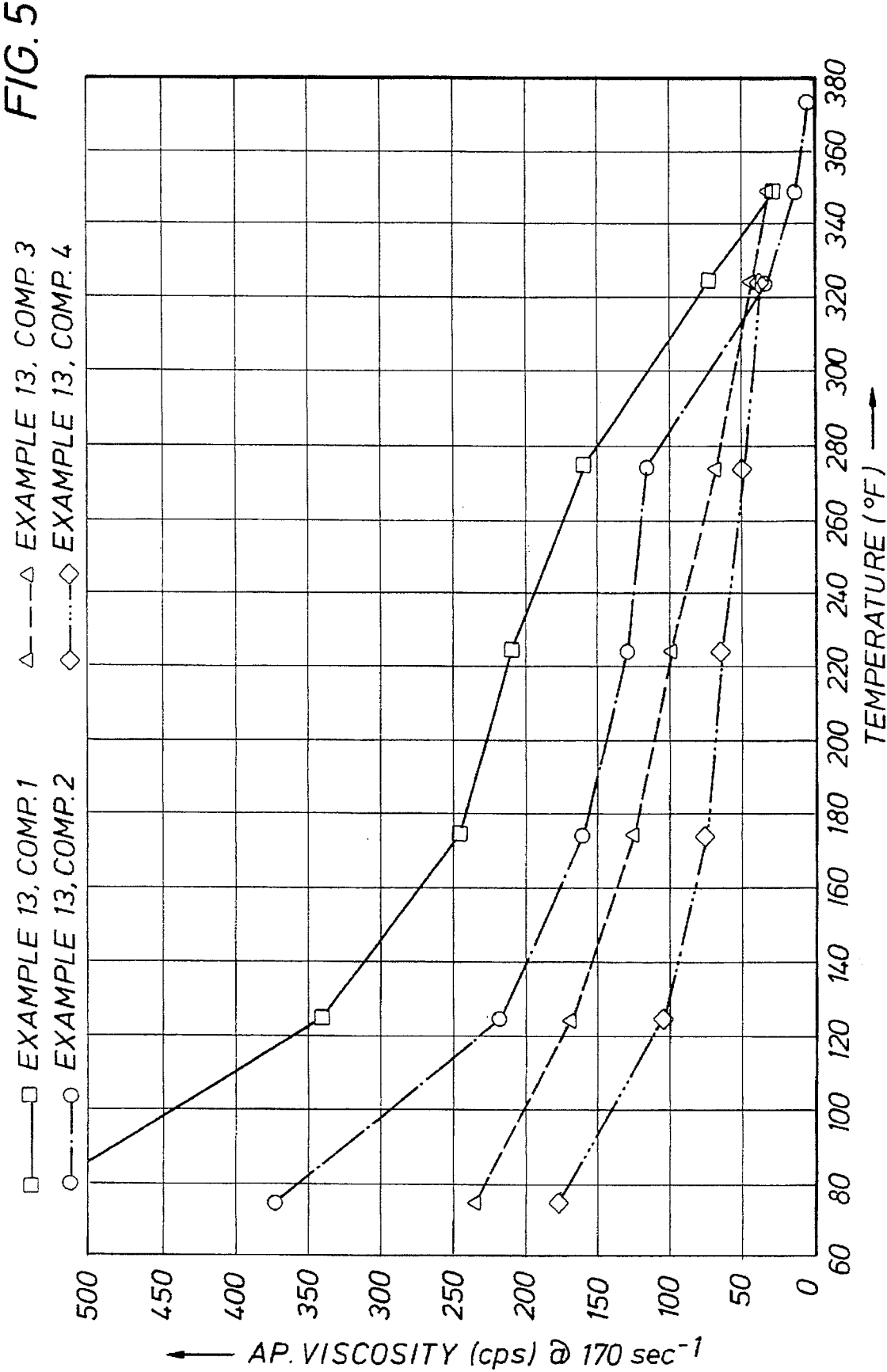

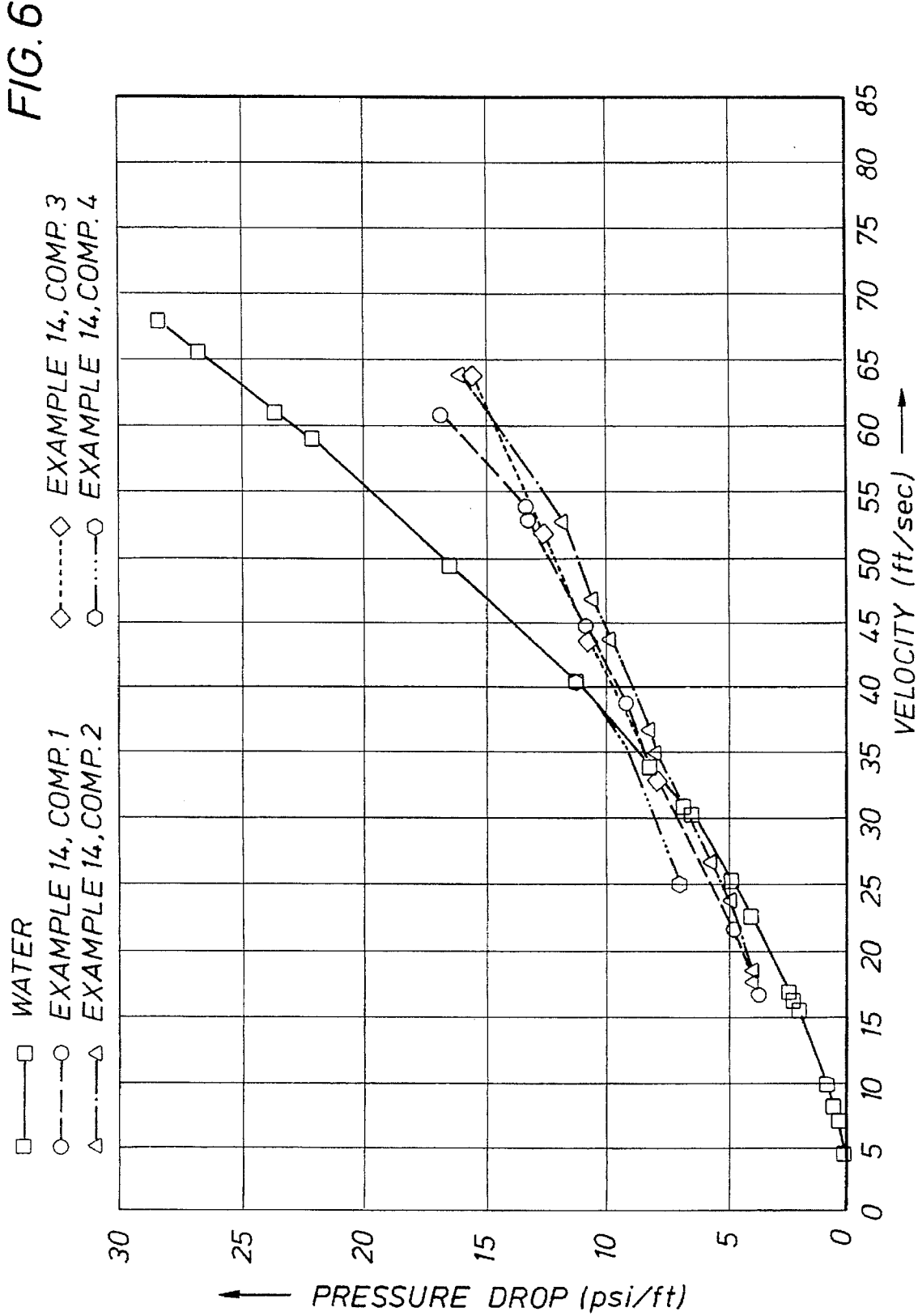

HIGH INTERNAL PHASE RATIO WATER-IN-OIL EMULSION FRACTURING FLUID

This invention relates to the art of the recovery of hydrocarbon fluids from subterranean formation, and particularly, to a fracturing fluid and method of fracturing a hydrocarbon-bearing formation.

BACKGROUND OF THE INVENTION

In the art of recovering hydrocarbon values from subterranean formations, it is common, particularly in formations of low permeability, to hydraulically fracture the hydrocarbon-bearing formation to provide flow channels to facilitate production of the hydrocarbons to the wellbore. Fracturing fluids typically comprise a thickened base fluid which primarily permits the suspension of particulate proppant materials in the fluid. These proppant materials, typically sand, sintered bauxite or the like, will remain in place within the fracture when fracturing pressure is released thereby holding the fracture open. Such thickened fluids also aid in the transfer of hydraulic fracturing pressure to the rock surfaces and help to control leak-off of the fracturing fluid into the formation.

Of necessity, fracturing fluids are prepared on the surface and then pumped through tubing within the wellbore to the hydrocarbon-bearing subterranean formation. While high viscosity is a desirable characteristic of a fluid within the formation in order to efficiently transfer fracturing pressures to the rock as well as to reduce fluid leak-off and provide for the suspension of proppants, large amounts of hydraulic horsepower are required to pump such high viscosity fluids through the well tubing to the formation.

The most common type of fracturing fluid comprises a polymer thickened base fluid wherein the thickening polymer comprises a galactomannangum, a cellulosic polymer or a synthetic polymer. To increase the viscosity and, thus, the proppant carrying capacity as well as to increase high temperature stability of the fracturing fluid, cross-linking of the polymers is commonly practiced. Typical cross-linking agents comprise soluble organo metallic salts. Metal ions provide for cross-linking or tying together of the polymer chains to increase the viscosity and to improve the theology of the fracturing fluid. In order to reduce the pumping friction pressure in such fluids, various methods of delaying cross-linking of the polymers have been developed. This allows the pumping of a relatively less viscous fracturing fluid having relatively low friction pressures within the well tubing with cross-linking being effected at or near the subterranean formation so that the advantageous properties of the thickened cross-linked fluid are available at the rock face.

One difficulty with polymer-thickened fluids is the deposit and retention of polymer residues at the rock face and within the proppant pack which can reduce the effectiveness of the fracturing operation. While there have been significant advancements in the use of oxidative or other breaker systems to reduce the effects of a polymer filter cake and other polymer residue within the fracture, such methods are never one hundred percent effective in cleaning the fracture.

One means of overcoming the effects of polymer residues remaining within a fracture would be to use a fracturing fluid comprising fluids which are compatible with existing formation fluids. Thus, various emulsions of water and oil have been proposed.

U.S. Pat. Nos. 3,710,865 and 3,977,472 have taught the use of stabilized oil-in-water emulsions as fracturing fluids. In these systems, the internal oil phase typically constitutes fifty to eighty volume percent of the emulsion. The water external phase is stabilized by adding a water dispersible polymeric thickening agent. The difficulty with these systems is that they are costly because they use relatively large amounts of oil and, since water dispersible polymeric thickening agents are used, the problem of polymer residues within the completed fracture still remains.

One approach to overcoming the use of costly oil in a water external emulsion for hydraulic fracturing, acidizing and other well treatment applications has been to use an oil-external or water-in-oil emulsion. Such oil-external emulsions generally comprise only about ten to thirty volume percent oil as opposed to the fifty to eighty percent oil typically found in water external emulsions. However, the major disadvantage of an oil-external emulsion which severely limits its use is its extremely high viscosity resulting in high frictional resistance to flow down well tubulars. This increased friction pressure is due to the high viscosity which such oil-external emulsions develop at low temperature. U.S. Pat. 3,387,074 describes a technique for overcoming the problem of high friction pressures in the pumping of viscous water in oil emulsions by providing a lubricating annulus of water which forms a physical barrier between the viscous emulsion and the well tubulars thereby considerably lowering the friction pressure drop in the pumping of these fluids. However, this technique requires the use of special wellhead equipment and fittings to create the conditions necessary to form the annular film of water between the viscous emulsion and the tubular wall.

Another means for overcoming the high friction pressure in pumping a viscous water-in-oil emulsion is described in U.S. Pat. No. 4,233,165. In this system, a water-in-oil emulsion in amounts of thirty to ninety-five percent by volume are dispersed in an aqueous medium to reduce the overall viscosity and friction pressure of the resultant dispersion to create a water-in-oil-in-water emulsion. The complications of this dual step dispersion process are apparent.

SUMMARY OF THE INVENTION

The present invention provides for the formulation of a water-in-oil emulsion fracturing fluid which has a viscosity at low surface temperatures which is pumpable using normal fracturing fluid pumping equipment and without the necessity of providing for an annular lubricating wall of water within the tubing nor the creation of a dispersion of the emulsion in water and, additionally, offers surprising high temperature stability.

In accordance with the invention, a fracturing fluid comprises a high internal phase invert oil-based emulsion wherein an aqueous internal phase comprises at least seventy-five percent of the emulsion and the oil includes an emulsifying agent for emulsifying an aqueous phase in the oil phase selected from a group consisting of (a) an effective amount of a block or graft copolymer having the general formula $(A\text{-}COO)_m B$, where m is an integer of at least 2; A is a polymeric component having a molecular weight of at least five hundred and is the residue of an oil-soluble complex monocarboxylic acid and B is a polymeric component having a molecular weight of at least five hundred and comprises a water soluble polyalkylene glycol (b) the reaction product of a polyalk(en)yl succinic anhydride and a polar compound having at least one hydroxyl or amino group and (c) mixtures thereof.

Further in accordance with the invention, the above fracturing fluid further includes a particulate proppant material.

Still further in accordance with the invention, the above fracturing fluid further includes a drag-reducing polymeric material.

Still further in accordance with the invention, a method of fracturing comprises formulating an invert oil-based emulsion as described above by dispersing at least seventy-five percent by volume aqueous phase in an oil phase including an effective amount of a block or graft copolymer of the general formula $(A-COO)_mB$ as described above and pumping the fracturing fluid at fracturing pressures into a subterranean formation.

Still further in accordance with the invention, a method of fracturing a subterranean formation as set forth above further includes the step of adding a drag-reducing agent to the emulsion prior to the step of pumping.

It is therefore an object of this invention to provide a fracturing fluid of the invert oil-based type which allows for reduced pumping friction pressures when compared to prior invert oil-based emulsion fracturing fluid systems.

It is yet another object of this invention to provide a fracturing fluid of an invert oil-based emulsion type which results in little or no damage to formation and fracture conductivity following completion of the fracturing treatment.

It is a still further object of this invention to provide a fracturing fluid of an invert oil-based emulsion type which offers excellent high temperature stability within a subterranean formation.

BRIEF DESCRIPTION OF THE DRAWINGS

The invention is described in greater detail in the specification as set forth hereinafter and in conjunction with the accompanying drawings forming a part of this specification and in which:

FIG. 5 illustrates the theology of emulsions prepared in accordance with the present invention utilizing different oil and water ratios:

FIG. 6 illustrates the affect of friction reducer concentration on flow properties of an emulsion in accordance with the present invention, and

DETAILED DESCRIPTION OF THE PREFERRED EMBODIMENTS AND THE DRAWINGS

Figure 1:
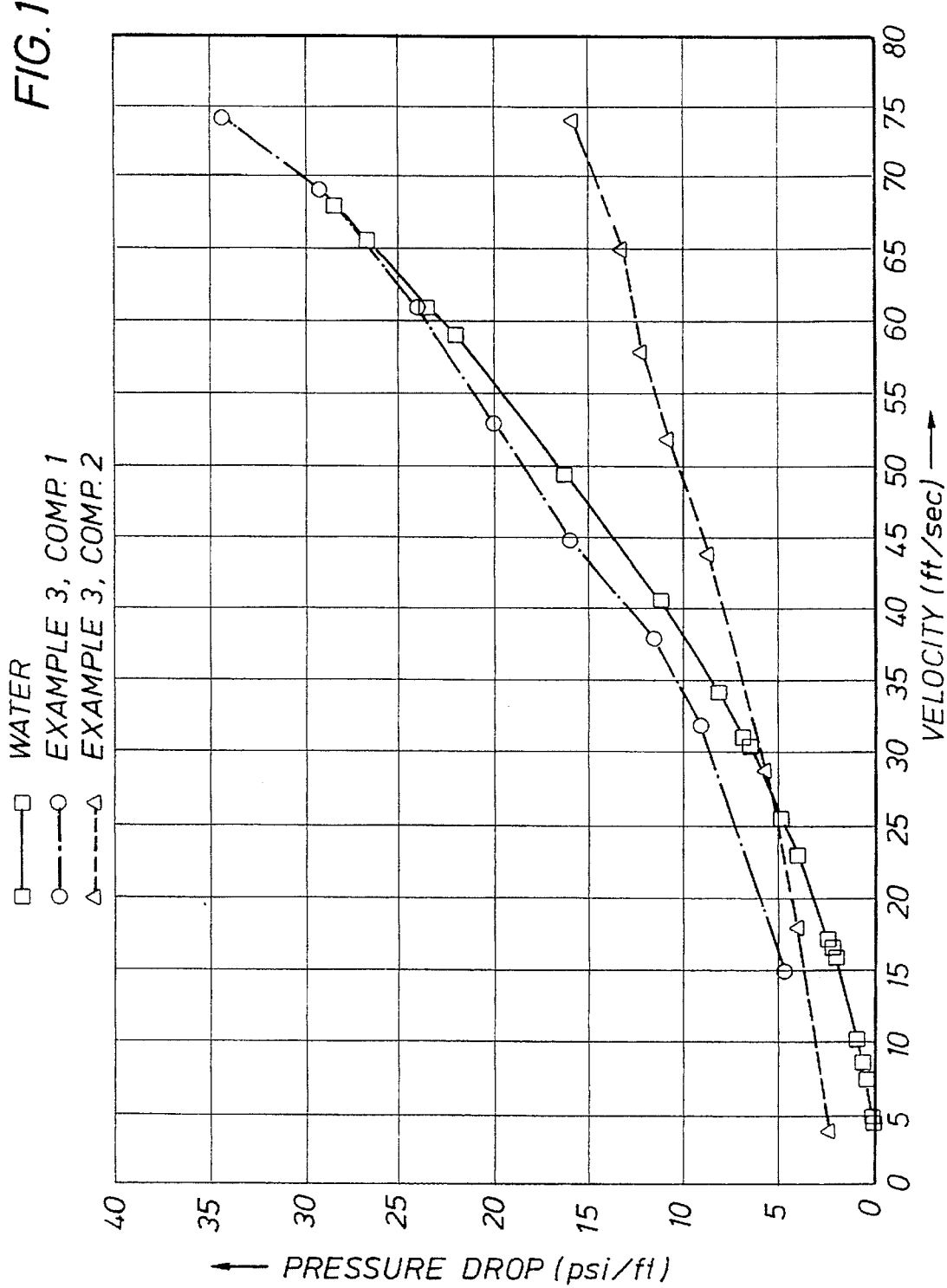
FIG. 1 illustrates the affect of friction reducer on the flow properties of an emulsion in accordance with the invention.

The invention will now be described in the more limited aspects of preferred embodiments thereof including various examples and illustrations of the formulation and use of the present invention. It will be understood that these embodiments are presented solely for the purpose of illustrating the invention and shall not considered as a limitation upon the scope thereof.

A series of emulsifying agents sold under the trademark "Hypermer" is produced by Imperical Chemical Industries.

These emulsifiers are described in U.S. Pat. Nos. 4,504,276, 4,509,950, 4,776,966.

These emulsifying agents sold under the trademark "Hypermer" are described as a block or graft co-polymer of the general formula $(A-COO)_mB$, where m in an integer of at least 2 and, A is a polymeric component having a molecular weight of at least 500 and is the residue of an oil-soluble complex mono-carboxylic acid of the general structural formula

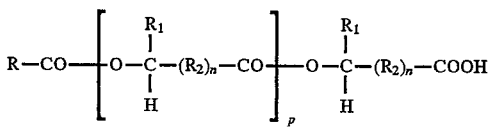

in which R is hydrogen or a monovalent hydrocarbon or substituted hydrocarbon group, $R_1$ is hydrogen or a monovalent $C_1$ to $C_{24}$ hydrocarbon group, $R_2$ is a divalent $C_1$ to $C_{24}$ hydrocarbon group, n is zero or 1 and p is zero or an integer of up to 200; and (b) B is a polymeric component having a molecular weight of at least 500 and, in the case where m is 2, is the divalent residue of a water-soluble polyalkylene glycol of the general formula:

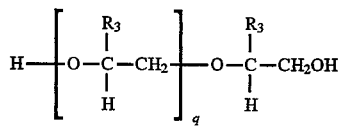

in which $R_3$ is hydrogen or a $C_1$ to $C_3$ alkyl group, q is an integer from 10 to 500, or, in the case where m is greater than 2, is the residue of valency m of a water-soluble polyether polyol of the general formula:

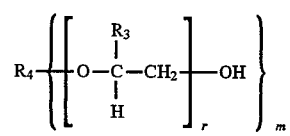

in which $R_3$ and m have their previous significance, r is zero or an integer from 1 to 500, provided that the total number of

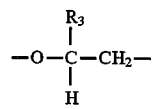

units in the molecule is at least 10, and $R_4$ is the residue of an organic compound containing in the molecule m hydrogen atoms reactive with an alkylene oxide.

Additional "Hypermer" emulsifiers include the reaction product of a polyalk(en)yl succinic anhydride with a polar compound containing in the molecule at least one hydroxyl or amino group. The preferred polyalk(en)yl succinic anhydride are poly (isobutenyl) succinic anhydrides having a molecular weight in the range of 400 to 5000. The preferred polar compound with which the anhydride is reacted may be a polyol such as ethylene glycol, propylene glycol, glycerol, trimethylol propane, pentaerythritol or sorbital; or with a polyamine, for example ethylene diamine, trimethylene diamine, hexamethylene diamine, dimethylaminopropylamine or diethylaminopropylamine or with a hydroxyamine for example monoethanolamine, diethanolamine, dipropanolamine, tris(hydroxymathyl)aminomethane or dimethylaminoethanol.

These emulsifiers have been used to emulsify polar organic materials such as methanol or ethanol in automotive fuel blends where the hydrocarbon external phase comprised eighty percent or more of the emulsion. These emulsifiers have also found use in high internal phase water-in-oil emulsion used for drilling fluids with a polyalk(en)yl succinic anhydride.

It has been found, in accordance with the present invention, that these emulsifiers form high internal phase ratio water-in-oil emulsions which have low temperature viscosities which are sufficiently low to avoid the high friction pressure losses present in other, prior art emulsions of this type and which maintain an acceptable viscosity at formation temperatures to permit their use as fracturing fluids.

The preferred emulsifiers are molecules having repeating hydrophilic and hydrophobic units. They tend to occupy a stable position at the interface, producing emulsions of high stability and controllable droplet size. When positioned at the interface, the extensive interactions of the polymer ensure a superior colloidal stability against coagulation or coalescence. In the systems, the hydrophilic portion of the molecule acts as an anchor group in the water phase and the hydrophobic polymeric chain portion penetrates into the oil providing a static stabilization barrier preventing strong interaction between droplets. For efficient static stabilization, the chemical structure of the polymeric chain required is determined by compatibility with the non-aqueous medium to be used. In addition the polymeric chain must have a molecular weight designed to the give optimum-size steric stabilization barrier. In principle, an almost infinite number of polymeric structures are suitable as sterically stabilizing surfactants. These include the following five basic structures: PEG alkyds with a fatty acid hydrophobe and polyethylene glycol hydrophile; long chain alkylene hydrophobe and polyethylene glycol hydrophile; polyhydroxy fatty acid hydrophobe and polyethylene glycol hydrophile; polymethacrylate hydrophobe and alkoxy polyethylene glycol hydrophile; and long-chain alkylene hydrophobe and anionic/nonionic (various) hydrophile.

Some emulsifiers have a very unique structure in that the hydrophobic portion of the molecule may consist of polymeric species that act functionally as "viscosity index improvers" keeping the viscosity of the oil phase from decreasing to the extent that it normally does as it is exposed to increasing temperature. This ability to keep the viscosity of the external phase more constant with temperature leads to added emulsion stability at higher temperature. Polymeric species that act as "viscosity index improvers" and thus may be incorporated into the emulsifier structure include polyisobutylene, polyisobutene, polymethacrylates i.e. copolymers of various long chain alkyl methacrylates, cinyl acetate-fumaric acid ester copolymers, polyacrylates i.e. copolymers of various chain length alkyl acrylates, polyalkyl styrene and polyvinyl esters of long chain fatty acids such as polyvinyl caprylate and polyvinyl palmitate.

The internal aqueous phase of the emulsion in accordance with the invention generally comprises at least a seventy-five percent, more preferably eighty to ninety-nine percent and most preferably ninety to ninety-five percent by volume of the total emulsion. Any water base fluid may comprise the aqueous phase such as brine, sea water, and the like in addition to fresh water.

The external oil phase can be any hydrocarbon liquid such as crude oil or a refined petroleum fraction such as diesel oil, gas condensate, gas oil, kerosene, gasoline and the like. Particular hydrocarbons such as benzene, toluene, ethylbenzene, cyclohexane, hexane, decane, hexadecane and the like may also be used. So called nontoxic and or biodegradable oils (Exxon Escaid 110, Exxon Escaid WS2547, Conoco LVT200, Henkel OMC720) with low aromatic oil content such as that described in U.S. Pat. No. 4,897,990 or other similar oils may be used as well as complex esters such as that sold by NL Barold under the trademark "Petrofree". The amount of external phase present in the total emulsion can be from about one to about twenty-five volume percent but preferably in the range of seven to twelve percent by volume of the emulsion.

In accordance with the invention, the high internal phase ratio emulsion consists of an oil external phase, an oil-soluble surfactant of the type described and a water internal phase. The high internal phase ratio emulsion is a high ratio of internal phase to external phase. The desired theological properties at different temperature ranges are achieved by changing the ratio of external to internal phase and/or by changing the emulsifying agent or concentration of the emulsifying agent. The emulsion components may also be changed or varied to provide scheduled fluid breakdown (significant viscosity reduction) at a particular temperature. Additional components may be added to the internal phase to perform acidizing well treatment application and can also be used to encapsulate or transport well treatment materials and chemicals into the wellbore or the formation. The salinity of the aqueous phase is not material and fresh water, saline water such as sea water or highly saline water such as petroleum reservoir connate water may be employed.

The test to determine that the emulsion has an external rather than an internal oil phase is to prepare an emulsion using 25% by weight potassium chloride as the aqueous phase and measuring electrical conductivity of the emulsion. If the conductivity is below about 0.1 mohs then the external phase is oil.

In accordance with the invention the water-in-oil emulsion is prepared by first dissolving the surfactants of the type described in a liquid hydrocarbon and vigorously mixing the blend with an aqueous fluid to form a stable, fine-grained emulsion. The hydrocarbon and surfactant blend contains the soluble surfactant, the surfactant concentration generally being in the range of about 0.15 to 5 weight percent and preferably 0.5 to 3 percent of hydrocarbon. The mixing operation for the emulsion is designed to form an emulsion having internal aqueous droplets with an average diameter of from about 0.01 to about 100 microns and preferably from about 0.1 to about 50 microns. The external oil phase comprising the hydrocarbon and surfactant blend should amount from about 1 to about 25 percent of the total volume of the emulsion and, preferably, from about 7 to about 12 percent by volume of the emulsion.

Thickening agents or and other chemicals may be added to the internal aqueous phase to increase the viscosity of the fracturing fluid, to delay the onset of turbulence and/or to stabilize the emulsion.

Friction reducers can also be incorporated into the oil external phase to delay the onset of turbulence which even further reduces the friction pressure of the emulsion when pumped through tubing. Any typical friction reducer may be used but polymers such as polyisobutyl methacrylate, polymethyl methacrylate and polyisobutylene as well as water soluble friction reducers such as guar gum, polyacrylamide and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks "FLO 1003, 1004, 1005 & 1008" have also been found to be effective. These polymeric species added as friction reducers or viscosity index improvers may also act as excellent fluid additives reducing or even eliminating the need for conventional fluid loss additives.

Although the preferred internal phase can consist of water, other, nonoily phases may be employed such as hydrazine, glycols such as ethylene glycol, diethylene glycol, propylene glycol, dipropylene glycol and the like.

The following examples will serve to illustrate various features and advantages of the present invention. Such examples should not be considered as a limitation upon the scope of Applicant's invention.

| EXAMPLE 1 COMPOSITION | |
|---|---|
| COMPONENT | VOLUME % |
| WATER | 89.33% |
| DIESEL OIL | 10.00 |
| HYPERMER B246 | 0.67% |

LABORATORY PROCEDURE FOR PREPARING HIGH-INTERNAL-PHASE-RATIO-EMULSION:

Equipment required: Tall-form beakers of 250 -ml capacity, Hamilton Beach mixer, and variable-speed controller. The apparatus is so set up that the tall-form beaker is clamped securely and the stirrer is situated as close to the bottom of the beaker as possible.

EMULSIFICATION PROCEDURE:

1. Place 15 ml of diesel oil (external phase) in the tall-form beaker and set the stirring motor to stir at a low speed. Add 1 gram HYPERMER B246 (surfactant). It may be necessary to heat the oil and surfactant to 110° F. for 10 minutes to dissolve the surfactant in diesel.

Add 2 to 3 ml of the water (internal phase) and allow the mixture to stir until homogeneous. With thorough mixing, add additional 2- to 3- ml increments until approximately 80 ml. of internal phase has been added' be careful never to add a volume of internal phase larger than the amount of emulsion already present in the beaker. Internal phase may now be added more rapidly. Addition of internal phase is continued until 135 ml of water have been added.

PERFORMANCE

Fluid Rheology

Results shown in table below demonstrate rheological performance of emulsion given above as obtained from Fann 50 rheological measurements. (API RP39—Second Edition, Jan. 1983, "Procedure for Evaluating Hydraulic Fracturing Fluids.:)

| Temp | N-prime | K | Corr | Viscosity (cps) | | |
|---|---|---|---|---|---|---|
| | | | | 40 sec$^{-1}$ | 170 sec$^{-1}$ | 511 sec$^{-1}$ |
| 78 | 0.347 | 0.2441 | 0.9997 | 1106 | 430 | 210 |
| 140 | 0.366 | 0.1615 | 1.0000 | 783 | 313 | 156 |
| 250 | 0.218 | 0.1232 | 0.6646 | 345 | 111 | 47 |
| 300 | 0.192 | 0.1074 | 0.9994 | 272 | 85 | 35 |
| 350 | 0.197 | 0.0481 | 0.9954 | 124 | 39 | 16 |
| 400 | 0.179 | 0.0279 | 0.9861 | 67 | 20 | 8 |

| EXAMPLE 2 COMPOSITION | |
|---|---|
| COMPONENT | VOLUME % |
| WATER | 89.85% |
| DIESEL OIL | 9.98% |
| HYPERMER E464 | 0.17% |

Results shown in table below demonstrate rheological performance of emulsion given shove as obtained from Fann 50 rheological measurements.

| | Viscosity (cps) | |
|---|---|---|
| Temp | 40 sec$^{-1}$ | 170 sec$^{-1}$ |
| 77 | 923 | 361 |
| 125 | 460 | 180 |
| 175 | 335 | 130 |
| 225 | 310 | 120 |
| 275 | 240 | 95 |
| 325 | 96 | 42 |
| 350 | 25 | 15 |

FLUID PERFORMANCE WITH FRICTION REDUCER

Results shown in FIG. 1 demonstrate the reduction in friction pressure that can be obtained by the addition of friction reducer to the oil external phase of the emulsion.

| COMPONENT | VOLUME % |
|---|---|
| EXAMPLE 3 COMPOSITION 1 | |
| WATER | 89.70% |
| KEROSENE | 9.97% |
| HYPERMER B246 | 0.33% |
| EXAMPLE 3 COMPOSITION 2 | |
| WATER | 89.64% |
| KEROSENE | 8.96% |
| HYPERMER B246 | 0.35% |
| CONOCO CDR | 0.05% |

Results shown in table below demonstrate theological performance of emulsion given above as obtained from Fann 50 rheological measurements.

| | viscosity (cps) | |
|---|---|---|
| Temp | 40 sec$^{-1}$ | 170 sec$^{-1}$ |
| 82 | 225 | 125 |
| 125 | 210 | 125 |
| 175 | 285 | 131 |
| 225 | 270 | 125 |
| 275 | 30 | 25 |

Results shown in table below and FIG. 1 demonstrate performance of emulsion with drag reducer from friction pressure tests in small diameter tubing.

| Velocity (ft/sec) | Percent Drag reduction |
|---|---|
| 15 | 25 |
| 20 | 25 |
| 30 | 31 |
| 40 | 38 |
| 50 | 44 |

FLUID PERFORMANCE IN SEAWATER

Figure 2:
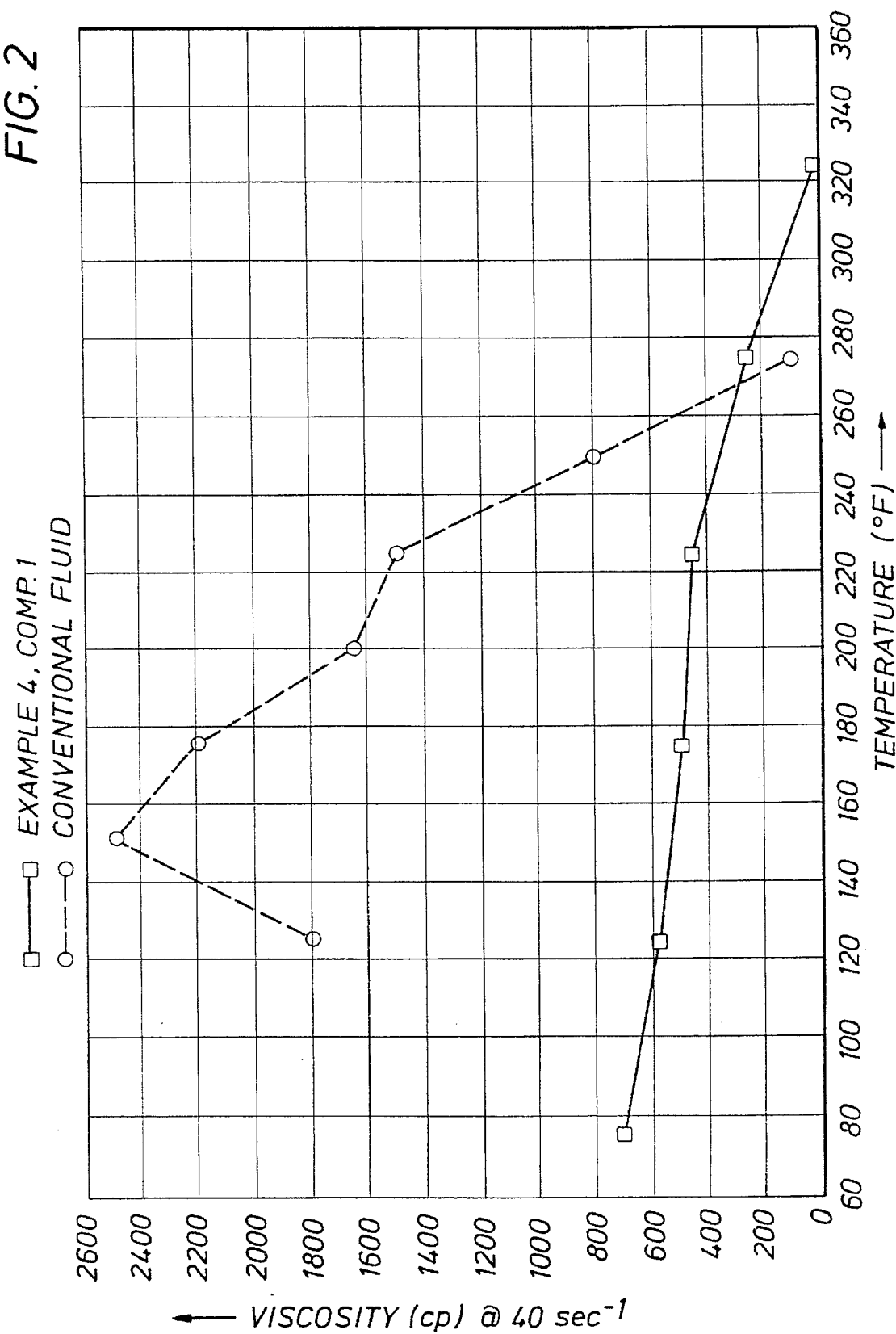
FIG. 2 illustrates the improved temperature stability of the emulsion in accordance with the invention over a conventional fracturing fluid in sea water.

Rheological tests of fluid performance show that these emulsions have excellent rheological performance in sea water. (See FIG. 2.) The conventional fluid composition in FIG. 2 is a 50 lbm/1000 gal guar, borate crosslinked fracturing fluid.

EXAMPLE 4 COMPOSITION 1

| COMPONENT | VOLUME % |
|---|---|
| SEA WATER | 89.70% |
| DIESEL | 9.97% |
| HYPERMER B246 | 0.33% |

Results shown in Table below demonstrate rheological performance of emulsion given above as obtained from Fann 50 rheological measurements.

| | Viscosity (cps) | |
|---|---|---|
| Temp | 40 sec$^{-1}$ | 170 sec$^{-1}$ |
| 75 | 704 | 280 |
| 125 | 550 | 220 |
| 175 | 490 | 183 |
| 225 | 410 | 132 |
| 275 | 225 | 77 |
| 325 | 15 | 9 |

EXAMPLE 5 COMPOSITION

| COMPONENT | VOLUME % |
|---|---|
| SEA WATER | 89.70% |
| DIESEL | 9.97% |
| HYPERMER E464 | 0.33% |

Results shown in table below demonstrate rheological performance of emulsion given above as obtained from Fann 50 rheological measurements.

| | Viscosity (cps) | |
|---|---|---|
| Temp | 40 sec$^{-1}$ | 170 sec$^{-1}$ |
| 75 | 543 | 211 |
| 125 | 607 | 243 |
| 175 | 453 | 161 |
| 225 | 300 | 108 |
| 275 | 186 | 62 |
| 325 | 14 | 10 |

FLUID PERFORMANCE IN ARCTIC DIESEL
EXAMPLE 6 COMPOSITION

| COMPONENT | VOLUME % |
|---|---|
| WATER | 89.70% |
| ARCTIC DIESEL | 9.97% |
| HYPERMER E464 | 0.33% |

Results shown in table below demonstrate rheological performance of emulsion given above as obtained from Fann 50 rheological measurements.

| | Viscosity (cps) | |
|---|---|---|
| Temp | 40 sec$^{-1}$ | 170 sec$^{-1}$ |
| 81 | 554 | 214 |
| 125 | 425 | 162 |
| 175 | 335 | 120 |
| 225 | 270 | 95 |
| 275 | 177 | 68 |

FLUID PERFORMANCE IN LOW TOXICITY DIESEL OIL REPLACEMENTS
EXAMPLE 7 COMPOSITION

| COMPONENT | VOLUME % |
|---|---|
| WATER | 89.85% |
| ESCAID 110 | 9.98% |
| HYPERMER E475 | 0.17% |

Results shown in table below demonstrate rheological performance of emulsion given above as obtained from Fann 50 rheological measurements.

| | Viscosity (cps) | |
|---|---|---|
| Temp | 40 sec$^{-1}$ | 170 sec$^{-1}$ |
| 75 | 864 | 316 |
| 125 | 595 | 217 |
| 175 | 425 | 152 |
| 225 | 305 | 130 |
| 275 | 75 | 28 |

FLUID PERFORMANCE IN RESIN-COATED SAND (API RP39)
EXAMPLE 8 COMPOSITION

| COMPONENT | VOLUME % |
|---|---|
| WATER | 89.85% |
| DIESEL | 9.98% |
| HYPERMER E475 | 0.17% |

Results of static proppant settling tests (with 100 grams emulsion and 100 grams sand or resin coated sand) shown below indicate that these emulsions are not affected by resin coated sand. (API RP39)

| Sand | Settling after 24 hours |
|---|---|
| 20/40 | None |
| RC* 20/40 | None |

FLUID PERFORMANCE - CONDUCTIVITY TESTING

| COMPONENT | VOLUME % |
|---|---|
| EXAMPLE 9 COMPOSITION 1 | |
| WATER | 89.85% |
| DIESEL | 9.98% |
| HYPERMER B246 | 0.17% |
| EXAMPLE 9 COMPOSITION 2 | |
| WATER | 89.76% |
| DIESEL | 9.98% |
| HYPERMER B246 | 0.17% |
| FLO 1005 | 0.09% |

*Resin coated

Results of conductivity tests shown below indicate that these emulsions show improved performance over conventional fracturing fluids.

| Fluid | Temp | lbs. APS* Breaker | % Retained Permeability |
|---|---|---|---|
| Uncrosslinked HPG 480 lbm/1000 gal (brine flowback only) | 175 | None | 41 |
| Uncrosslinked HPG 480 lbm/gal (brine/diesel flowback) | 175 | None | 44 |
| Crosslinked Guar Frac Fluid 400 lbm/1000 gal (brine flowback only) | 180 | None | 21 |
| Crosslinked Guar Frac Fluid 400 lbm/1000 gal (brine flowback only) | 180 | 8 | 54 |
| Emulsion Composition 1 (brine flowback only) | 180 | None | 38–83 |
| Emulsion Composition 2 (brine flowback only) | 180 | None | 44–83 |
| Emulsion Composition 1 (brine/diesel flowback) | 180 | None | 81–95 |
| Emulsion Composition 2 (brine/diesel flowback) | 180 | None | 87–100 |

*ammonium persulfate

RHEOLOGY COMPARISON OF PRIOR ART EMULSIONS VS PATENT EMULSIONS IN ACCORDANCE WITH THE INVENTION

EXAMPLE 10

Results show that patent emulsion show consistently lower viscosities than those reported in prior patents (Salathiel U.S. Pat. No. 4,233,165) and shown in table below.

| Fluid | Emulsion Type | Temp | Shear Rate(sec$^{-1}$) | Viscosity (cp) |
|---|---|---|---|---|
| Salathiel | w/o | 200° F. | 40 | 1300 |
| Example 1 + | w (w/o) | 200° F. | 40 | 900 |
| FIG. 5 | o/w | 200° F. | 40 | 230 |
| Salatheil | w/o | 200° F. | 170 | 400 |
| Example 1 + | w (w/o) | 200° F. | 170 | 250 |
| FIG. 5 | o/w | 200° F. | 170 | 110 |
| Salatheil | w/o | 75 | 40 | 6000 |
| Example 2 + | w (w/o) | 75 | 40 | 550 |
| FIG. 6 | o/w | 75 | 40 | 350 |
| Salathiel | w/o | 75 | 170 | 1400 |
| Example 2 + | w (w/o) | 75 | 170 | 260 |
| FIG. 6 | o/w | 75 | 170 | 180 |

| COMPONENT | VOLUME % |
|---|---|
| PATENT EMULSIONS | |
| WATER | 89.60% |
| KEROSENE | 9.96% |
| HYPERMER B246 | 0.35% |
| FLO 1008 | 0.09% |
| EMULSION COMPOSITION 2 | |
| WATER | 89.60% |
| KEROSENE | 9.96% |
| HYPERMER B246 | 0.35% |
| FLO 1005 | 0.09% |
| EMULSION COMPOSITION 3 | |
| WATER | 89.60% |
| KEROSENE | 9.96% |
| HYPERMER B246 | 0.35% |
| CONOCO CDR | 0.09% |

| Fluid | Temp | Shear Rate (sec$^{-1}$) | Viscosity cp |
|---|---|---|---|
| Emulsion Composition 1 | 75 | 40 | 333 |
| | 75 | 170 | 154 |
| | 220 | 40 | 320 |
| | 220 | 170 | 184 |
| Emulsion Composition 2 | 75 | 40 | 273 |
| | 75 | 170 | 155 |
| | 220 | 40 | 208 |
| | 220 | 170 | 60 |
| Emulsion Composition 3 | 75 | 40 | 225 |
| | 75 | 170 | 125 |
| | 220 | 40 | 277 |
| | 220 | 170 | 129 |

RHEOLOGY PERFORMANCE VS CONVENTIONAL FRACTURING FLUIDS

EXAMPLE 11

Figure 3:
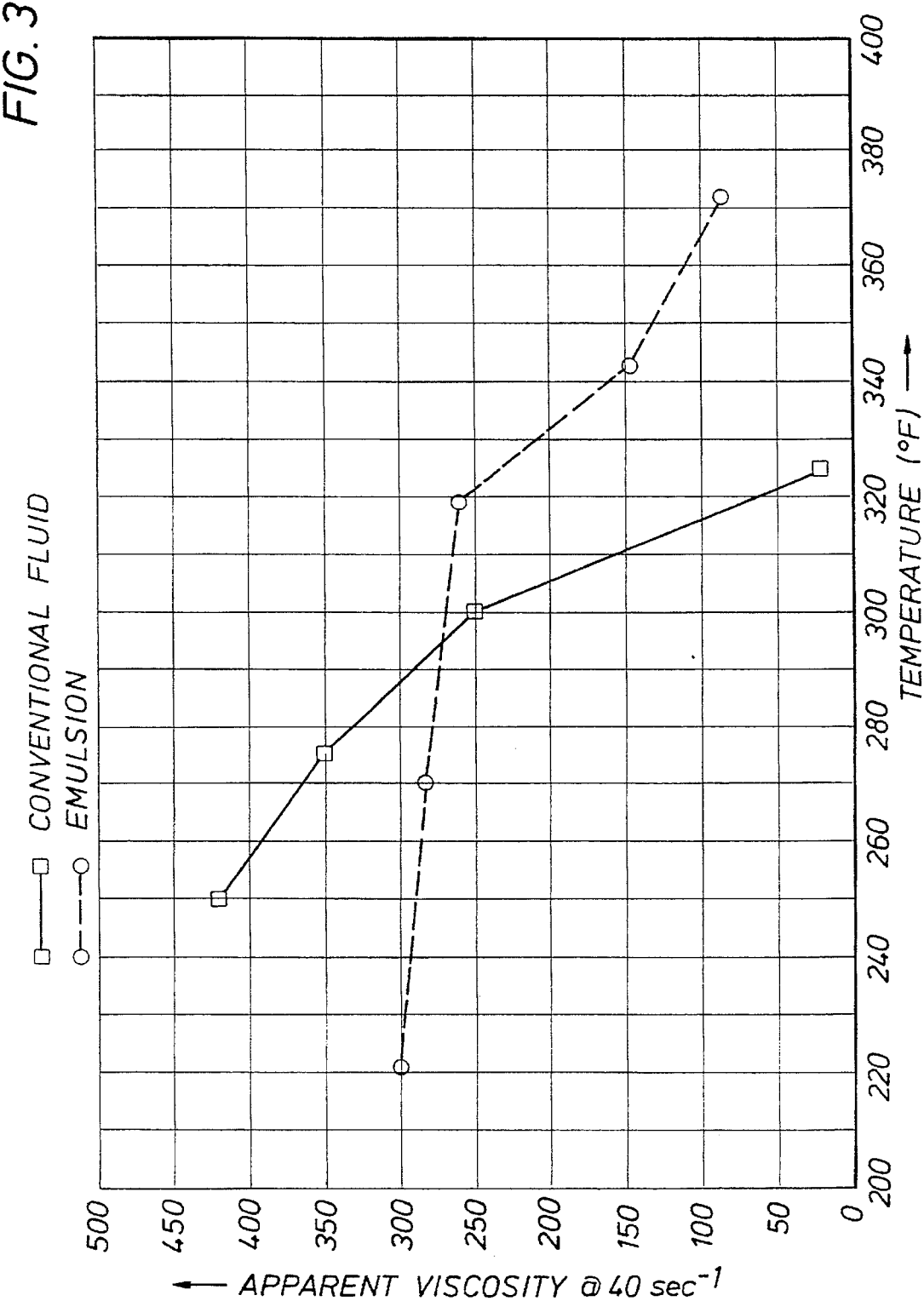
FIG. 3 illustrates the improved temperature stability of the emulsion in accordance with the invention over a conventional water-based fracturing fluid.

FIG. 3 shows the improved temperature stability of the emulsion over a conventional water-based fracturing fluid. The conventional fluid composition in FIG. 1 is a 40 lbm/1000 gal hydroxypropyl guar zirconium crosslinked fracturing fluid typically used at high temperatures. The emulsion composition is

| COMPONENT | VOLUME % |
|---|---|
| WATER | 89.70% |
| DIESEL | 9.97% |
| HYPERMER E464 | 0.33% |

RHEOLOGY DEPENDENCE ON CONCENTRATION

EXAMPLE 12

Figure 4:
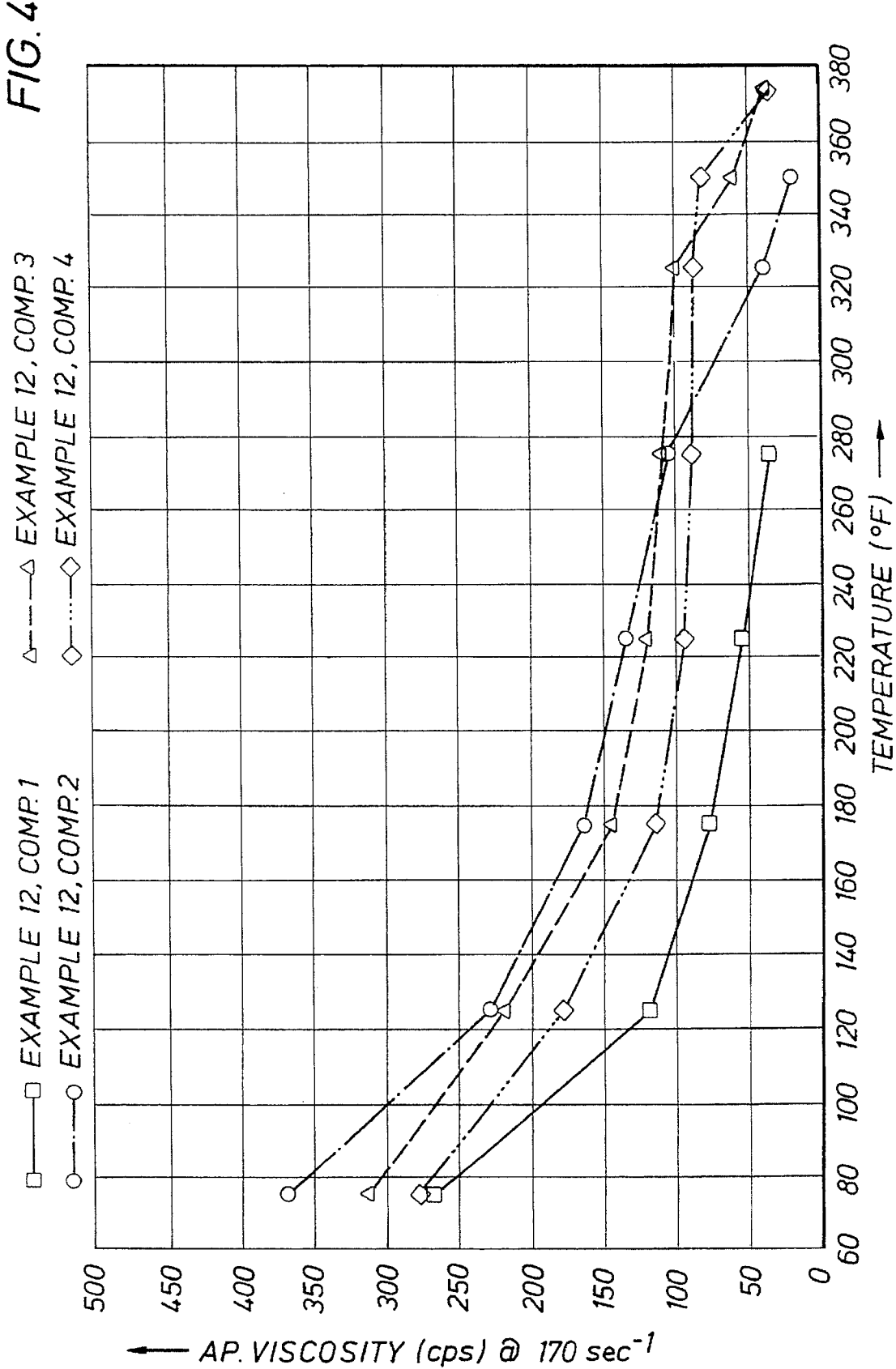
FIG. 4 illustrates the temperature stability of a fracturing fluid in accordance with the invention at various concentrations of emulsifier.

FIG. 4 shows that the temperature stability and thus breaking of these emulsions can be controlled by emulsifier concentration.

| COMPONENT | VOLUME % |
|---|---|
| EMULSION COMPOSITION 1 | |
| WATER | 89.93% |
| DIESEL | 9.99% |
| HYPERMER E464 | 0.08% |
| EMULSION COMPOSITION 2 | |
| WATER | 89.85% |
| DIESEL | 9.98% |
| HYPERMER E464 | 0.17% |
| EMULSION COMPOSITION 3 | |
| WATER | 89.70% |
| DIESEL | 9.97% |
| HYPERMER E464 | 0.33% |
| EMULSION COMPOSITION 4 | |
| WATER | 89.55% |
| DIESEL | 9.95% |
| HYPERMER E464 | 0.50% |

RHEOLOGY DEPENDENCE ON OIL EXTERNAL PHASE PERCENTAGE

EXAMPLE 13

FIG. 5 shows rheology of emulsions prepared with different oil concentrations.

| COMPONENT | VOLUME % |
|---|---|
| EMULSION COMPOSITION 1 | |
| WATER | 92.95% |
| DIESEL | 6.88% |
| HYPERMER E464 | 0.17% |
| EMULSION COMPOSITION 2 | |
| WATER | 89.91% |
| DIESEL | 9.92% |
| HYPERMER E464 | 0.17% |
| EMULSIONS COMPOSITION 3 | |
| WATER | 86.96% |
| DIESEL | 12.88% |
| HYPERMER E464 | 0.16% |
| EMULSION COMPOSITION 4 | |
| WATER | 85.23% |
| DIESEL | 14.53% |
| HYPERMER E464 | 0.24% |

FRICTION PRESSURE DEPENDENCE ON FRICTION REDUCER CONCENTRATION

There is an optimum friction reducer concentration for the emulsion which is dependent on friction reducer concentration, type of friction reducer (solubility of friction reducer in particular oil), and emulsifier used.

EXAMPLE 14

(See FIG. 6)

This shows that there is an optimum friction reducer concentration for maximum drag reduction. Results show that there is a minimum amount of friction reducer needed to effect friction reduction. Results also show that there is maximum concentration of friction reducer. Above the maximum concentration the friction reduction with increased friction reducer cannot compensate for the increased friction pressure due to the increased viscosity of the emulsion (caused by the higher viscosity of the oil phase with high concentration of friction reducer).

| COMPONENT | VOLUME % |
|---|---|
| EMULSION COMPOSITION 1 | |
| WATER | 89.67% |
| KEROSENE | 9.96% |
| HYPERMER B246 | 0.35% |
| FLO 1005 | 0.02% |
| EMULSION COMPOSITION 2 | |
| WATER | 89.64% |
| KEROSENE | 9.96% |
| HYPERMER | 0.35% |
| FLO 1005 | 0.05% |
| EMULSION COMPOSITION 3 | |
| WATER | 89.60% |
| KEROSENE | 9.96% |
| HYPERMER B246 | 0.35% |
| FLO 1005 | 0.09% |
| EMULSION COMPOSITION 4 | |
| WATER | 89.51% |
| KEROSENE | 9.95% |
| HYPERMER B246 | 0.35% |
| FLO 1005 | 0.19% |

EFFECT OF EMULSIFIER ON EMULSION TEMPERATURE STABILITY

EXAMPLE 15

HYPERMER emulsifiers show much improved temperature stability over typical invert emulsifiers such as Span 80.

| COMPONENT | VOLUME % |
|---|---|
| EMULSION COMPOSITION 1 | |
| WATER | 89.91% |
| DIESEL | 9.92% |
| HYPERMER E464 | 0.17% |
| EMULSION COMPOSITION 2 | |
| WATER | 89.91% |
| DIESEL | 9.92% |
| SPAN 80 | 0.17% |

Continuous-in-line mixers may be used to prepare the emulsions of the present invention on a larger scale. These mixers comprise in-line static mixers installed within a pipe or conduit. In one preferred process oil/emulsifier solution and water are pumped as separate streams into a pipe containing a Sulzer/Koch SMV type mixer. This mixer comprises numerous static elements rotated through 90° and arranged successively in the pipe or conduit. The static mixers form a uniform emulsion from the water and oil/emulsifier solution streams.

While the invention has been described in the more limited aspects of preferred embodiments thereof, other embodiments have been suggested and still others will occur for those skilled in the art upon a reading and understanding of the foregoing specification. It is intended that all such embodiments be included within the scope of this invention as limited only by the appended claims.

Having thus described my invention,

We claim:

1. A fracturing fluid for fracturing of subterranean formations comprising a high internal phase invert oil-based emulsion wherein the aqueous internal phase comprises at least seventy five percent of the emulsion and an external oil phase including an emulsifying agent for emulsifying the aqueous phase in the oil phase is selected from a group consisting of (a) an effective amount of a block or graft copolymer having the general formula $(A-COO)_m B$, wherein m is an integer of at least 2, A is a polymeric component having a molecular weight of at least five hundred and is the residue of an oil-soluble complex monocarboxylic acid and B is a polymeric component having a molecular weight of at least five hundred and comprises a water soluble polyalkylene glycol, (b) a reaction product of a polyalk(en)yl succinic anhydride and a polar compound having at least one hydroxyl or amino group and (c) mixtures thereof.

2. The fracturing fluid as set forth in claim 1 wherein the emulsifying agent comprises a block or graft co-polymer of the general formula $(A\text{-}COO)_mB$, where m in an integer of at least 2 and, A is a polymeric component having a molecular weight of at least 500 and is the residue of an oil-soluble complex mono-carboxylic acid of the general structural formula:

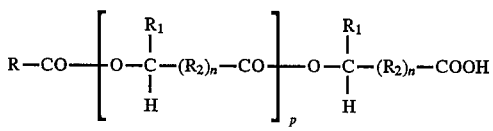

in which R is hydrogen or a monovalent hydrocarbon or substituted hydrocarbon group, $R_1$ is hydrogen or a monovalent $C_1$ to $C_{24}$ hydrocarbon group, $R_2$ is a divalent $C_1$ to $C_{24}$ hydrocarbon group, n is zero or 1 and p is zero or an integer of up to 200; and (b) B is a polymeric component having a molecular weight of at least 500 and, in the case where m is 2, is the divalent residue of a water-soluble polyalkylene glycol of the general formula:

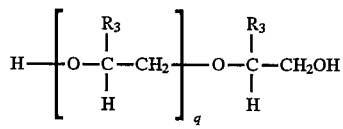

in which R3 is hydrogen or a $C_1$ to $C_3$ alkyl group, q is an integer from 10 to 500, or, in the case where m is greater than 2, is the residue of valency m of a water-soluble polyether polyol of the general formula:

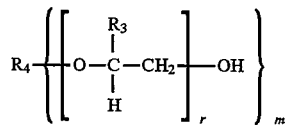

in which $R_3$ and m have their previous significance, r is zero or an integer from 1 to 500, provided that the total number of

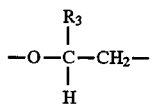

units in the molecule is at least 10, and $R_4$ is the residue of an organic compound containing in the molecule m hydrogen atoms reactive with an alkylene oxide.

3. The fracturing fluid as set forth in claim 1 wherein the oil phase comprises one to twenty-five percent by volume oil.

4. The fracturing fluid as set forth in claim 3 wherein the oil phase comprises five to twelve percent by volume oil.

5. The fracturing fluid as set forth in claim 1 wherein said emulsifying agent is present in an amount ranging from 0.05 to 5 weight percent.

6. The fracturing fluid as set forth in claim 5 wherein said emulsifying agent is present in an amount ranging from about 0.15 to about 3 percent by weight.

7. The fracturing fluid as set forth in claim 1 further including a proppant.

8. The fracturing fluid as set forth in claim 1 further including a drag reducer.

9. The fracturing fluid as set forth in claim 8 wherein said drag reducer is selected from a group consisting of poly-isobutyl methacrylate, polymethyl methacrylate, polyisobutylene, guar gum, polyacrylamide, polyethylene oxide, a high molecular weight polyolefin.

10. The fracturing fluid as set forth in claim 8 wherein said drag reducer is present in the range of about 0.0005 to 1% volume percent.

11. The fracturing fluid as set forth in claim 10 wherein said drag reducer is present in an amount ranging from 0.005 to 1 percent by volume.

12. The fracturing fluid as set forth in claim 1 wherein said emulsion comprises internal aqueous droplets having an average particle diameter of about 0.01 to about 100 microns.

13. The fracturing fluid as set forth in claim 12 wherein the emulsion includes internal aqueous droplets having an average diameter of about 0.1 to about 50 microns.

14. The fracturing fluid as set forth in claim 1 wherein the internal aqueous phase selected from a group consisting of acid, brine, connate water, sea water and fresh water.

15. The fracturing fluid as set forth in claim 1 wherein the oil phase is selected from a group consisting of crude oil, diesel, kerosene, gas condensate, gas oil, gasoline and a low-toxicity oil fraction.

16. The fracturing fluid as set forth in claim 1 wherein the emulsifying agent comprises the reaction product of a polyalk(en)yl succinic anhydride and a polar compound having at least one hydroxyl or amino group.

17. A method of fracturing a subterranean formation comprising the steps of:

dissolving an effective amount of an emulsifier selected from a group consisting of (a) block or graft copolymer of the formula $(A\text{-}COO)_mB$ wherein m is an integer of at least 2, A is a polymeric component having a molecular weight of at least five hundred and is the residue of an oil soluble complex mono-carboxylic acid and B is a polymeric component having a molecular weight of at least five hundred and comprises a water soluble polyalkylene glycol, (b) reaction product of a polyalk(en)yl succinic anhydride and a polar compound having at least one hydroxyl or amino group and (c) mixtures thereof; said emulsifier being dissolved in an oil phase;

dispersing at least seventy five percent by volume aqueous phase in the oil phase to form an oil-external emulsion and pumping the fracturing fluid at fracturing pressure into a subterranean formation.

18. The method of fracturing as set forth in claim 17 further including the step of adding a proppant to the emulsion.

19. The method of fracturing as set forth in claim 17 further including the step of adding a drag reducer to the emulsion prior to the step of pumping.

20. The method of fracturing as set forth in claim 17 wherein the step of dissolving comprises dissolving a block or graft co-polymer of the general formula $(A\text{-}COO)_mB$, where m in an integer of at least 2 and, A is a polymeric component having a molecular weight of at least 500 and is the residue of an oil-soluble complex mono-carboxylic acid of the general structural formula:

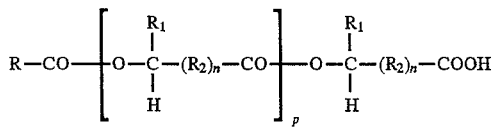

in which R is hydrogen or a monovalent hydrocarbon or substituted hydrocarbon group, $R_1$ is hydrogen or a monovalent $C_1$ to $C_{24}$ hydrocarbon group, $R_2$ is a divalent $C_1$ to $C_{24}$ hydrocarbon group, n is zero or 1 and p is zero or an integer of up to 200; and (b) B is a polymeric component having a molecular weight of at least 500 and, in the case where m is 2, is the divalent residue of a water-soluble polyalkylene glycol of the general formula:

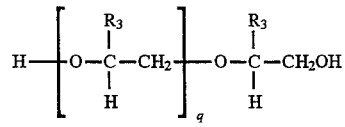

in which R3 is hydrogen or a $C_1$ to $C_3$ alkyl group, q is an integer from 10 to 500, or, in the case where m is greater than 2, is the residue of valency m of a water-soluble polyether polyol of the general formula:

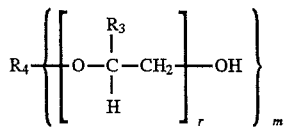

in which $R_3$ and m have their previous significance, r is zero or an integer from 1 to 500, provided that the total number of

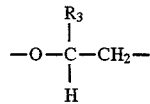

units in the molecule is at least 10, and $R_4$ is the residue of an organic compound containing in the molecule m hydrogen atoms reactive with an alkylene oxide.

21. The method of fracturing is set forth in claim 17 wherein the step of dissolving comprises dissolving a reaction product of a polyalk(en)yl succinic anhydride and a polar compound having at least one hydroxyl or amino group.

\* \* \* \* \*